United States Patent
Sudo et al.

(10) Patent No.: US 12,284,452 B2
(45) Date of Patent: Apr. 22, 2025

(54) INFRARED PROCESSING SYSTEM, INFRARED SENSOR SYSTEM, INFRARED PROCESSING METHOD, AND PROGRAM

(71) Applicant: Panasonic Intellectual Property Management Co., Ltd., Osaka (JP)

(72) Inventors: Ryota Sudo, Aichi (JP); Nayuta Minami, Fukui (JP); Nobuaki Shimamoto, Fukui (JP); Naoki Kobayashi, Fukui (JP); Shoya Kida, Shimane (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 321 days.

(21) Appl. No.: 17/777,484

(22) PCT Filed: Sep. 16, 2020

(86) PCT No.: PCT/JP2020/035100
§ 371 (c)(1),
(2) Date: May 17, 2022

(87) PCT Pub. No.: WO2021/106322
PCT Pub. Date: Jun. 3, 2021

(65) Prior Publication Data
US 2022/0408037 A1    Dec. 22, 2022

(30) Foreign Application Priority Data
Nov. 27, 2019    (JP) .................................. 2019-214469

(51) Int. Cl.
*H04N 25/50*    (2023.01)
*G01J 5/00*    (2022.01)
(Continued)

(52) U.S. Cl.
CPC ............. *H04N 25/50* (2023.01); *G01J 5/0025* (2013.01); *G06V 40/10* (2022.01); *H04N 23/11* (2023.01); *G01J 2005/0077* (2013.01)

(58) Field of Classification Search
CPC ........ H04N 25/50; H04N 23/11; G06V 40/10; G01J 5/0025
(Continued)

(56) References Cited

U.S. PATENT DOCUMENTS 5,995,206 A    11/1999   Morinaka et al.
2001/0039806 A1  11/2001   Kawai et al.
(Continued)

FOREIGN PATENT DOCUMENTS

CN    106989824 A    7/2017
JP    H08-320258 A    12/1996
(Continued)

OTHER PUBLICATIONS

International Search Report dated Nov. 24, 2020 issued in International Patent Application No. PCT/JP2020/035100, with English translation.
(Continued)

*Primary Examiner* — Sath V Perungavoor
*Assistant Examiner* — Kristin Dobbs
(74) *Attorney, Agent, or Firm* — Rimon P.C.

(57) ABSTRACT

An infrared processing system includes a first thermal image generating unit, an object extracting unit, a second thermal image generating unit, and an object temperature calculating unit. The first thermal image generating unit generates, using a first temperature correction value, a first thermal image based on the output signal of the image sensor. The object extracting unit extracts the object from the first thermal image. The second thermal image generating unit generates, using a second temperature correction value corresponding
(Continued)

to the object that has been extracted by the object extracting unit, a second thermal image based on the output signal of the image sensor. The object temperature calculating unit calculates, based on the second thermal image that has been generated by the second thermal image generating unit, a temperature of the object that has been extracted by the object extracting unit.

12 Claims, 4 Drawing Sheets

(51) Int. Cl.
  *G06V 40/10* (2022.01)
  *H04N 23/11* (2023.01)
(58) Field of Classification Search
  USPC .......................................................... 348/164
  See application file for complete search history.

(56) References Cited

U.S. PATENT DOCUMENTS

| | | |
|---|---|---|
| 2009/0008552 A1 | 1/2009 | Tadano |
| 2011/0068272 A1 | 3/2011 | Dupont et al. |
| 2013/0048855 A1* | 2/2013 | Abreo ................ G01J 5/025 250/330 |
| 2015/0312488 A1* | 10/2015 | Kostrzewa ............ H04N 25/50 348/164 |
| 2016/0063711 A1 | 3/2016 | Ogasawara |
| 2016/0187022 A1 | 6/2016 | Miwa et al. |
| 2018/0234628 A1* | 8/2018 | Kobayashi ............ H04N 25/67 |

FOREIGN PATENT DOCUMENTS

| | | |
|---|---|---|
| JP | 2001-349786 A | 12/2001 |
| JP | 2003-259217 A | 9/2003 |
| JP | 2009-014475 A | 1/2009 |
| JP | 2010-216817 A | 9/2010 |
| JP | 5794916 B2 | 8/2015 |
| JP | 2016-052096 A | 4/2016 |
| JP | 2018-185108 A | 11/2018 |
| JP | 2019-032154 A | 2/2019 |
| JP | 2019-052889 A | 4/2019 |
| WO | 2015/029378 A1 | 3/2015 |
| WO | 2015/122201 A1 | 8/2015 |
| WO | 2017/073401 A1 | 5/2017 |

OTHER PUBLICATIONS

First Office Action and Search Report received in corresponding Chinese Patent Application No. 202080079177.9, dated Oct. 31, 2024 with partial English translation.

* cited by examiner

INFRARED PROCESSING SYSTEM, INFRARED SENSOR SYSTEM, INFRARED PROCESSING METHOD, AND PROGRAM

CROSS-REFERENCE OF RELATED APPLICATIONS

This application is the U.S. National Phase under 35 U.S.C. § 0371 of International Patent Application No. PCT/JP2020/035100, filed on Sep. 16, 2020, which in turn claims the benefit of Japanese Patent Application No. 2019-214469, filed on Nov. 27, 2019, the entire disclosures of which Applications are incorporated by reference herein.

TECHNICAL FIELD

The present disclosure generally relates to an infrared processing system, an infrared sensor system, an infrared processing method, and a program, and more particularly relates to an infrared processing system that captures an image of an object by receiving an infrared ray coming from the object, and an infrared sensor system, an infrared processing method, and a program that use the infrared processing system.

BACKGROUND ART

An infrared camera described in Patent Literature 1 includes an infrared sensor, a correction candidate designating unit, a difference calculating unit, and a correction processing unit. The correction candidate designating unit regards, from among pixels of the infrared sensor, pixels having a pixel value equal to or less than a predetermined threshold value as pixels representing a background in an image captured, and designates these pixels as correction candidates. The difference calculating unit selects, from among the correction candidate pixels, pixels having a pixel value different from a reference value, and sets the difference as a correction coefficient for the selected pixels. The correction processing unit corrects, for which the correction coefficient has been set, the pixel value of the pixels by using the correction coefficient, and outputs the corrected value as an output value.

Patent Literature 1 does not particularly describe a detectable temperature range of the infrared camera. In general, the infrared camera has its detectable temperature range set broadly to detect temperatures of various objects. Therefore, when the infrared camera has its output signal (voltage) converted into a temperature to generate a thermal image, errors are likely to occur. Accordingly, the temperature distribution of the thermal image of the infrared camera contains a lot of errors. As a result, the temperature of the object as an imaging target cannot be accurately detected based on the thermal image of the infrared camera. In addition, there is a growing demand for accurately detecting, using an infrared camera, the temperatures of objects which tend to have different temperatures.

CITATION LIST

Patent Literature

Patent Literature 1: JP 2003-259217 A

SUMMARY OF INVENTION

It is therefore an object of the present disclosure to provide an infrared processing system, an infrared sensor system, an infrared processing method, and a program, all of which are configured or designed to accurately detect temperatures of objects which tend to have different temperatures.

An infrared processing system according to one aspect of the present disclosure includes a processing unit configured to process an output signal of an image sensor configured to receive an infrared ray coming from an object. The processing unit includes a first thermal image generating unit, an object extracting unit, a second thermal image generating unit, and an object temperature calculating unit. The first thermal image generating unit is configured to generate, using a first temperature correction value, a first thermal image based on an output signal of the image sensor. The object extracting unit is configured to extract the object from the first thermal image that has been generated by the first thermal image generating unit. The second thermal image generating unit is configured to generate, using a second temperature correction value corresponding to the object that has been extracted by the object extracting unit, a second thermal image based on the output signal of the image sensor. The object temperature calculating unit is configured to calculate, based on the second thermal image that has been generated by the second thermal image generating unit, a temperature of the object that has been extracted by the object extracting unit.

An infrared sensor system according to another aspect of the present disclosure includes the infrared processing system and the image sensor.

An infrared processing method according to still another aspect of the present disclosure includes a processing step including processing an output signal of an image sensor having a plurality of photosensors, each receiving an infrared ray coming from an object. The processing step includes a first thermal image generating step, an object extracting process, a second thermal image generating process, and an object temperature calculating step. The first thermal image generating step includes generating, using a first temperature correction value, a first thermal image based on the output signal of the image sensor. The object extracting step includes extracting the object from the first thermal image that has been generated in the first thermal image generating step. The second thermal image generating step includes generating, using a second temperature correction value corresponding to the object that has been extracted in the object extracting step, a second thermal image based on the output signal of the image sensor. The object temperature calculating step includes calculating, based on the second thermal image that has been generated in the second thermal image generating step, a temperature of the object that has been extracted in the object extracting step.

A program according to one aspect of the present disclosure is a program that causes a computer system to perform the infrared processing method.

DESCRIPTION OF EMBODIMENTS

Embodiment

Figure 1:
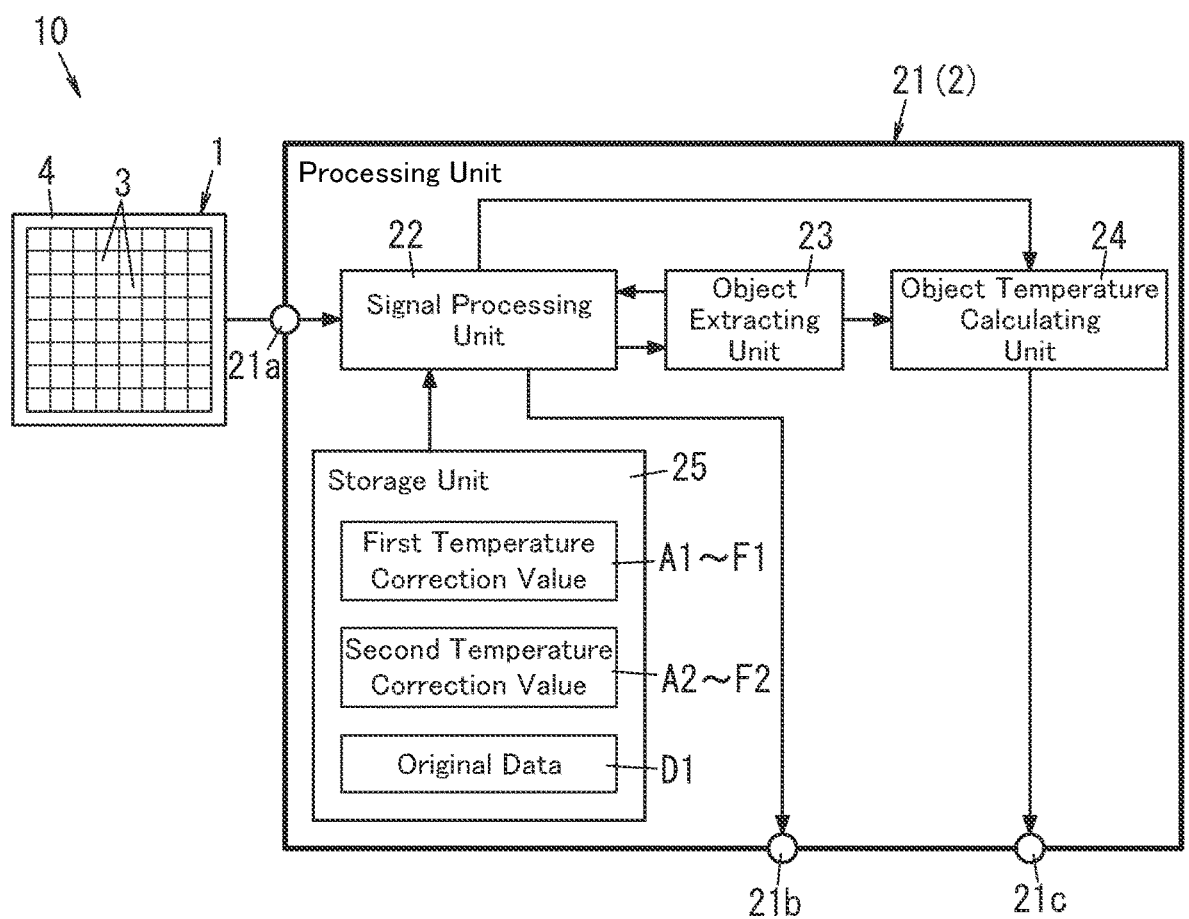
FIG. 1 is a block diagram of an infrared sensor system according to an embodiment.
Figure 2A:
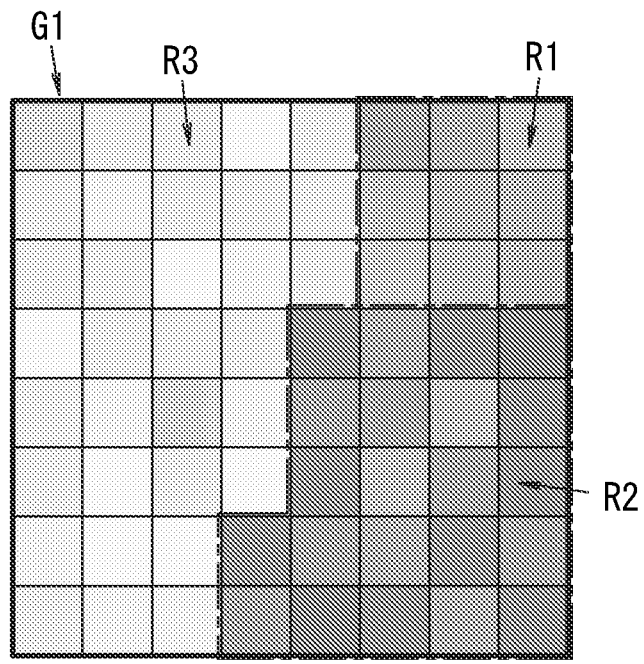
FIG. 2A illustrates an exemplary first thermal image.
Figure 2B:
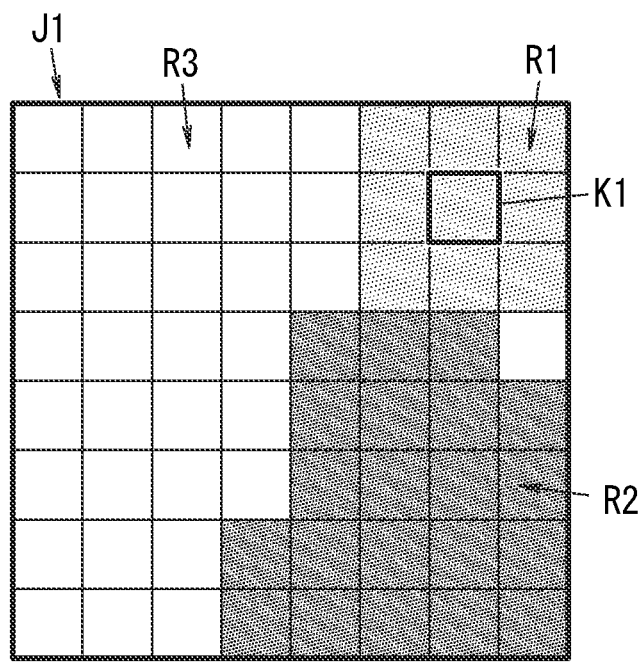
FIG. 2B illustrates exemplary object information.
Figure 3:
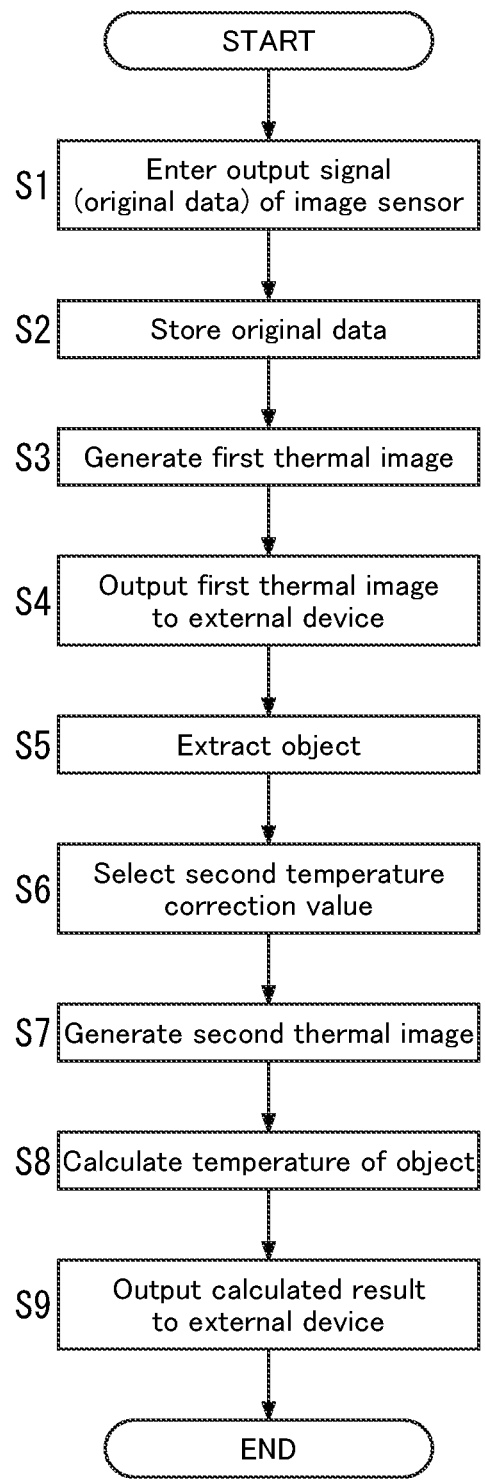
FIG. 3 is a flowchart for the infrared sensor system.

Referring to FIGS. 1 to 3, an infrared sensor system 10 according to an exemplary embodiment will be described.

As shown in FIG. 1, an infrared sensor system 10 is a system that receives an infrared ray coming from an object as an imaging target to capture an image of the object as a thermal image and then detects the temperature of the object as the imaging target based on the thermal image. In the following description, a situation will be described where, as objects as the imaging targets, an image of a human face and body (clothes) is captured, for example, and the temperatures of the human face and body (clothes) are detected.

The infrared sensor system 10 includes an image sensor 1 and an infrared processing system 2.

The image sensor 1 is an element that receives an infrared ray coming from objects (a human face and body, for example) as imaging targets and thereby captures an image of the objects. The image sensor 1 includes a plurality of infrared photosensors 3 and a substrate 4. The infrared photosensors 3 are arranged on one principal surface of the substrate 4 in columns and rows (i.e., arranged in a matrix pattern). Each of the infrared photosensors 3 receives an infrared ray coming from the objects and transforms the received infrared ray into an electrical signal having a voltage corresponding to the thermal energy of the infrared ray. The plurality of infrared photosensors 3 correspond one to one to a plurality of pixels that form the thermal image. The output signal of each infrared photosensor 3 constitutes a pixel signal of a corresponding pixel thereof. The image sensor 1 supplies, as output signals, the electrical signals that have been transformed by the plurality of infrared photosensors 3 to the infrared processing system 2.

The infrared processing system 2 generates a thermal image based on the output signal of the image sensor 1 and detects the temperature of the objects as imaging targets based on the thermal image thus generated. The infrared processing system 2 includes a processing unit 21 that processes the output signal of the image sensor 1.

The processing unit 21 includes an input unit 21a and two output units 21b and 21c. The input unit 21a receives the output signal (analog signal) of the image sensor 1. The output unit 21b provides the thermal image (a first thermal image to be described later) that has been generated based on the output signal of the image sensor 1 by the processing unit 21, to an external device. The output unit 21c provides temperature data representing the temperatures of the objects as imaging targets that have been detected by the processing unit 21, to an external device.

The processing unit 21 includes a signal processing unit 22 (a first thermal image generating unit, a second thermal image generating unit), an object extracting unit 23, an object temperature calculating unit 24, a storage unit 25 (a first storage unit, a second storage unit).

The storage unit 25 is a nonvolatile storage unit that may store various types of information and data, and may be implemented as, for example, an SSD (Solid State Drive) or an HDD (hard disk drive). The storage unit 25 stores first temperature correction value A1-F1, and multiple sets of second temperature correction values A2-F2 to be described later. The multiple sets of second temperature correction values A2-F2 correspond one to one to a plurality of objects as imaging targets. In addition, the storage unit 25 stores, as original data D1, the output signal of the image sensor 1 as will be described later.

The signal processing unit 22 AD (analog-digital) converts the output signal of the image sensor 1 that have been provided via the input unit 21a, and is loaded with the output signal thus converted. The signal processing unit 22 generates, by Expression 1 using the first temperature correction value, a first thermal image based on the output signal of the image sensor 1 that has been provided via by the input unit 21a, and outputs the first thermal image thus generated to the object extracting unit 23 and the output unit 21b. Note that, as the first thermal image is output to the output unit 21b, the first thermal image may be output from the output unit 21b to the external device. As used herein, the "thermal image" is an image representing the imaging target as a temperature distribution. More specifically, the signal processing unit 22 transforms, by the following Expression 1, voltage Vout of the output signal of each infrared photosensor 3 of the image sensor 1 (i.e., the pixel signals of each pixel) into a temperature To, thereby generating a thermal image based on the output signal of the image sensor 1. The temperature To indicates the temperature of a pixel corresponding to the infrared photosensor 3 in the thermal image.

Expression 1

$$\text{To} = \frac{B + \sqrt{C + D*Ts^2 + E*Ts + F*Vout}}{A} \qquad \text{Expression 1}$$

In Expression 1, the reference signs A to F represent temperature correction values, and the reference sign Ts represents an ambient temperature (hereinafter also referred to as a "background temperature") of the objects as imaging targets. That is to say, a first thermal image is generated based on the output signal of the image sensor 1 by substituting, in Expression 1, the first temperature correction value A1-F1 for the temperature correction values A-F. When the first thermal image is generated, the representative value of a predetermined ambient temperature, for example, may be substituted for the ambient temperature (a background temperature) Ts.

In a stage in which the first thermal image is generated, objects as imaging targets have not been identified yet. Thus, the first temperature correction value is set at a temperature correction value corresponding to a relatively broad temperature range (e.g., temperatures falling within the range from −40° C. to 85° C.) to deal with various objects.

More specifically, when generating the first thermal image based on the output signal of the image sensor 1, the signal processing unit 22 adjusts the gain of the output signal of the image sensor 1 and adjusts the voltage range of the output signal of the image sensor 1 to a relatively broad first voltage range (a voltage range broader than a second voltage range to be described later). In a stage of generating the first thermal image, the objects as imaging targets have not been identified yet. Thus, the signal processing unit 22 adjusts the gain and voltage range of the output signal of the image sensor 1 to deal with various objects. Specifically, the voltage range is adjusted to a relatively broad range, and the gain is also adjusted so that the voltage range may be adjusted to a relatively broad voltage range.

Further, the signal processing unit 22 stores, in the storage unit 25, the output signal of the image sensor 1 that have been provided to the input unit 21a, as original data D1. As will be described later, the signal processing unit 22 generates, after the extracting process has been performed by the object extracting unit 23, the second thermal image based on the output signal of the image sensor 1 by using the second temperature correction values A2-F2. At that time, the signal processing unit 22 generates the second thermal image based on the output signal (the original data D1) of the image sensor 1 stored in the storage unit 25.

The object extracting unit 23 extracts objects as imaging targets (such as a human face and body (clothes)) based on the first thermal image that has been generated by the signal processing unit 22. More specifically, the object extracting unit 23 extracts pixel locations corresponding to the objects based on the first thermal image. Even more specifically, the object extracting unit 23 separates a face area, a body area and, a background area from the temperature distribution of the first thermal image. Based on the separation result, the object extracting unit 23 generates object information, and outputs the object information thus generated to the signal processing unit 22 and the object temperature calculating unit 24.

Note that the face area is an area in which a human face is shot, and is set as a temperature area in which the temperature is equal to or higher than 30° C. and lower than 40° C., for example. The body area is an area in which a human body (i.e., clothes) is shot, and is set as a temperature area in which the temperature is equal to or higher than 0° C. and lower than 30° C. The background area (hereinafter also referred to as a "surrounding area") is set as an area, other than the face area and body area, of the thermal image. That is to say, the object extracting unit 23 extracts, from the first thermal image, a temperature area in which the temperature is equal to or higher than 30° C. and less than 40° C. as a face area. The object extracting unit 23 also extracts, from the first thermal image, a temperature area in which temperature is equal to or higher than 0° C. and lower than 30° C. as a body area, and further extracts, from the first thermal image, an area other than the face area and body area as a background area.

Note that the above-described temperatures of a face and body (clothes) are only examples. For example, depending on conditions such as the ambient temperature and solar radiation, the temperature of the clothes may become equal to or higher than 30° C. In that case, the temperature of clothes may be set at a value equal to or higher than 0° C. and lower than 50° C. If clothes and face cannot be distinguished from each other according to the temperature, one of the following two measures (1) and (2) may be employed. (1) If the face position does not change so significantly as in an image shot in an automobile, for example, a default face area is set beforehand, a temperature area falling within the default face area is determined to be a face area, and a temperature area under the face area is determined to be a body (clothes) area. (2) In a case where the distance from this system 10 to the objects does not change so significantly, a temperature area having a particular size is determined to be a face area and a temperature area under the face area is determined to be a body (clothes) area. Note that, according to both of these measures (1) and (2), the body is located on the supposition that the body should be present under the face. The measure (1) locates the face by setting the area and the measure (2) locates the face by setting the size.

The object information includes type information, pixel location information, and background temperature information. The type information is information for recognizing the types (a face or a body, for example) of the objects extracted from the first thermal image. The pixel location information is information for determining the pixel location of the objects (a face and body, for example) extracted from the first thermal image. The background temperature information is information about the temperature of the background area and may be an average temperature of the background area, for example. The background temperature information may be omitted. In that case, the temperature of the background area will be determined by the combination of the first thermal image and the pixel location information.

FIG. 2A and FIG. 2B illustrate an exemplary first thermal image G1 and exemplary object information J1, respectively. In the example shown in FIG. 2A, in the first thermal image G1, an area R1 is a face area, an area R2 is a body area, and an area R3 is a background area (a surrounding area). In an example shown in FIG. 2B, the object information J1 is an image having the same size as the first thermal image G1 and including the following type information and pixel location information as additional information. Specifically, the type information and pixel location information includes information indicating that the area R1 is a face area, information indicating that the area R2 is a body area, and information indicating that the area R3 (an area other than the areas R1, R2) is a background area, for example. In the example shown in FIG. 2B, the object information J1 further includes information indicating the center K1 of the face area.

Referring back to FIG. 1, the signal processing unit 22 selects, based on the object information provided by the object extracting unit 23, a set of second temperature correction values A2-F2 that corresponds to the objects extracted by the object extracting unit 23, from among multiple sets of second temperature correction values A2-F2. More specifically, the signal processing unit 22 changes the set of second temperature correction values A2-F2 to use, depending on whether or not the temperatures of the objects (a face or a body) extracted by the object extracting unit 23 are equal to or higher than a first threshold value (of 30° C.). That is to say, the temperature of the face area is set to fall within the range from 30° C. to 40° C., for example. The temperature of the body area (clothes area) is set to fall within the range from 0° C. to 30° C. Accordingly, if the temperature of the object extracted by the object extracting unit 23 is equal to or higher than 30° C., the signal processing unit 22 determines the object to be the face, and then selects a set of second temperature correction values A2-F2 corresponding to the face out of multiple sets of second temperature correction values A2-F2. If the temperature of the object extracted by the object extracting unit 23 is lower than 30° C., the signal processing unit 22 determines the object to be the body, and then selects, from among the multiple sets of second temperature correction values A2-F2, a set of second temperature correction values A2-F2 corresponding to the body (as an object).

Then, the signal processing unit 22 generates, by Expression 1, the second thermal image based on the original data D1 (i.e., the output signal of the image sensor 1) stored in the storage unit 25, by using the selected set of second temperature correction values A2-F2 (i.e., the set of second temperature correction value corresponding to the objects extracted by the object extracting unit 23).

When generating the second image by Expression 1, the signal processing unit 22 uses the selected set of second temperature correction value A2-F2 as a set of temperature correction values A-F, and uses the background temperature (the ambient temperature) information, included in the object information provided by the object extracting unit 23, as an ambient temperature Ts.

In the stage of generating the second thermal image, the objects as imaging targets (a face and body, for example) have been identified by the object extracting unit 23. Thus, the set of the second temperature correction values are set at temperature correction values falling within a relatively narrow temperature range corresponding to the objects thus identified. In the present embodiment, in the first thermal image, a human face and body (clothes) are shot as imaging targets. The set of second temperature correction values corresponding to the face are temperature correction values, of which the temperature range corresponds to the temperature range (the range from 30° C. to 40° C., both inclusive) of the face. The set of second temperature correction value corresponding to the body (clothes) are temperature correction values, of which the temperature range corresponds to the temperature range (from 0° C. to 30° C., both inclusive) of the body (clothes).

The signal processing unit 22 locates, based on the object information provided by the object extracting unit 23, a face area and a body area in the original data D1. Then, the signal processing unit 22 generates the second thermal image based on the original data D1, by using a set of second temperature correction values A2-F2 corresponding to the face (as an object) with respect to the output signals of the infrared photosensors 3 corresponding to the face area in the original data D1, using a set of second temperature correction values A2-F2 corresponding to the body (as an object) with respect to the output signals of the infrared photosensors 3 corresponding to the body area, and not using any temperature correction values (i.e., not making correction) with respect to the output signals of the infrared photosensors 3 corresponding to the background area. That is to say, according to the present embodiment, the signal processing unit 22 corrects, using the set of second temperature correction values A2-F2 corresponding to the objects, only a part, corresponding to the objects extracted by the object extracting unit 23, of the output signal of the image sensor 1. Note that, since the background area of the second thermal image is not particularly used in the present embodiment, correction using the set of second temperature correction values A2-F2 is not performed.

When generating the second thermal image based on the original data D1 (i.e., the output signal of the image sensor 1), the signal processing unit 22 adjusts the gain of the output signal of the image sensor 1 and adjusts a voltage range of the output signal of the image sensor 1 to a relatively narrow, second voltage range (i.e., a voltage range narrower than the first voltage range). In the stage of generating the second thermal image, the objects (a human face and body, for example) as imaging targets have been identified by the object extracting unit 23. Thus, the signal processing unit 22 adjusts the gain and voltage range of output signal of the image sensor 1 so that the temperature resolution of the temperature distribution of the objects shot in the second thermal image becomes as fine as possible. Specifically, the gain is adjusted to a relatively large value (such as a maximum value or a saturation value), and the voltage range is adjusted to a relatively narrow voltage range.

The signal processing unit 22 outputs the second thermal image thus generated to the object temperature calculating unit 24.

The object temperature calculating unit 24 calculates, based on the second thermal image supplied from the signal processing unit 22, the temperatures of the objects (a face and body, for example) extracted by the object extracting unit 23, i.e., the temperatures of the objects as imaging targets. More specifically, the object temperature calculating unit 24 determines, based on the pixel location information of the objects (a face and body) included in the object information provided by the object extracting unit 23, the pixel locations of the objects shot in the second thermal image. Then, the object temperature calculating unit 24 detects, based on the second thermal image, the temperatures at the pixel locations thus determined. In the temperature distributions of the pixel regions covering the objects shot in the second thermal image, their temperature resolution has been adjusted to as fine a value as possible. This allows the object temperature calculating unit 24 to accurately detect the temperatures of the objects based on the second thermal image. The object temperature calculating unit 24 provides the object temperatures thus detected to the output unit 21b. As a result, the object temperatures thus detected are output to an external device.

Next, referring to FIG. 3, the operation of the infrared sensor system 10 will be described.

The output signal of the image sensor 1 is provided via the input unit 21a to the processing unit 21 (in S1). In the processing unit 21, the signal processing unit 22 stores the output signal of the image sensor 1 as the original data D1 in the storage unit 25 (in S2). Then, the signal processing unit 22 generates, using the first temperature correction value, a first thermal image based on the output signal of the image sensor 1 (in S3), and then outputs the first thermal image thus generated to the object extracting unit 23. Then, the signal processing unit 22 outputs the first thermal image via the output unit 21b to an external device (in S4). Then, the object extracting unit 23 extracts objects (a human face and body, for example) as imaging targets from the first thermal image, and then generates object information based on the result of extraction (in S5). The object extracting unit 23 outputs the object information thus generated to the signal processing unit 22 and the object temperature calculating unit 24. The signal processing unit 22 selects, based on the object information provided by the object extracting unit 23, a set of second temperature correction values corresponding to the extracted objects, from among the multiple sets of second temperature correction values (in S6).

Then, the signal processing unit 22 generates, using the selected set of second temperature correction values (i.e., a set of second temperature correction values corresponding to the objects extracted by the object extracting unit 23), the second thermal image based on the original data D1 stored in the storage unit 25 (in S7). Next, the signal processing unit 22 outputs the second thermal image thus generated to the object temperature calculating unit 24. Subsequently, the object temperature calculating unit 24 calculates, based on the second thermal image supplied from the signal processing unit 22, the temperatures of the objects that have been identified by the object information provided by the object extracting unit 23 (in S8). Then, the object temperature calculating unit 24 provides the results of detection (the temperatures of the objects) to the output unit 21c (in S9).

As described above, in the infrared sensor system 10 and the infrared processing system 2 according to the present embodiment, a first thermal image is generated, using first temperature correction values A1-F1, based on an output signal of the image sensor 1, and then objects (such as a human face and body) are extracted from the first thermal image thus generated. Accordingly, using, as the first temperature correction values A1-F1, temperature correction values corresponding to a relatively broad temperature range enables extracting, from the first thermal image, the objects (such as the human face and body) which tend to have different temperatures with moderate accuracy. Then, a second thermal image is generated based on the output signal of the image sensor 1 by using second temperature correction values A2-F2 corresponding to the objects extracted from first thermal image, and then the temperatures of the objects that have been extracted are calculated based on the second thermal image thus generated. Thus, this enables accurately calculating the temperatures of the objects. As a result, the temperatures of objects which tend to have different temperatures may be calculated accurately based on the thermal image.

(Variations)

Note that any of the variations to be described below may be combined as appropriate. Also, the functions of the infrared processing system 2 may also be implemented as an infrared processing method or a computer program.

An infrared processing method according to one aspect includes a processing step including processing an output signal of an image sensor having a plurality of photosensors, each receiving an infrared ray coming from an object. The processing step includes a first thermal image generating step, an object extracting step, a second thermal image generating step, and an object temperature calculating step. The first thermal image generating step includes generating, using a first temperature correction value, a first thermal image based on the output signal of the image sensor. The object extracting step includes extracting the object from the first thermal image that has been generated in the first thermal image generating step. The second thermal image generating step includes generating, using a second temperature correction value corresponding to the object that has been extracted in the object extracting step, a second thermal image based on the output signal of the image sensor 1. The object temperature calculating step includes calculating, based on the second thermal image that has been generated in the second thermal image generating step, a temperature of the object that has been extracted in the object extracting step.

A program according to another aspect is designed to cause a computer system to perform the infrared processing method.

The following description of variations will be focused on the difference from the embodiment described above. In the following description of variations, any constituent element, having the same function as a counterpart of the embodiment described above, will be designated by the same reference numeral as that counterpart's, and description thereof may be omitted herein.

(First Variation)

In the embodiment described above, the signal processing unit 22 corrects, using the second temperature correction values, only a part, corresponding to the objects that have been extracted by the object extracting unit 23, of the output signal of the image sensor 1. However, the signal processing unit 22 may correct, using the second temperature correction values, the entire output signal of the image sensor 1 (i.e., not only a part of the output signal corresponding to the objects, but also a part of the output signal corresponding to the background area). That is to say, since the background area of the second thermal image is not used for any particular purpose, the background area as well as the object area may be corrected by using the second temperature correction values.

(Second Variation)

In the embodiment described above, at least either the first temperature correction values stored in the storage unit 25 or the second temperature correction values stored in the storage unit 25 may be rewritable. This allows at least one of the first temperature correction values or the second temperature correction value to be rewritten after the manufacture (after shipment) of the infrared processing system 2.

(Third Variation)

Figure 4:
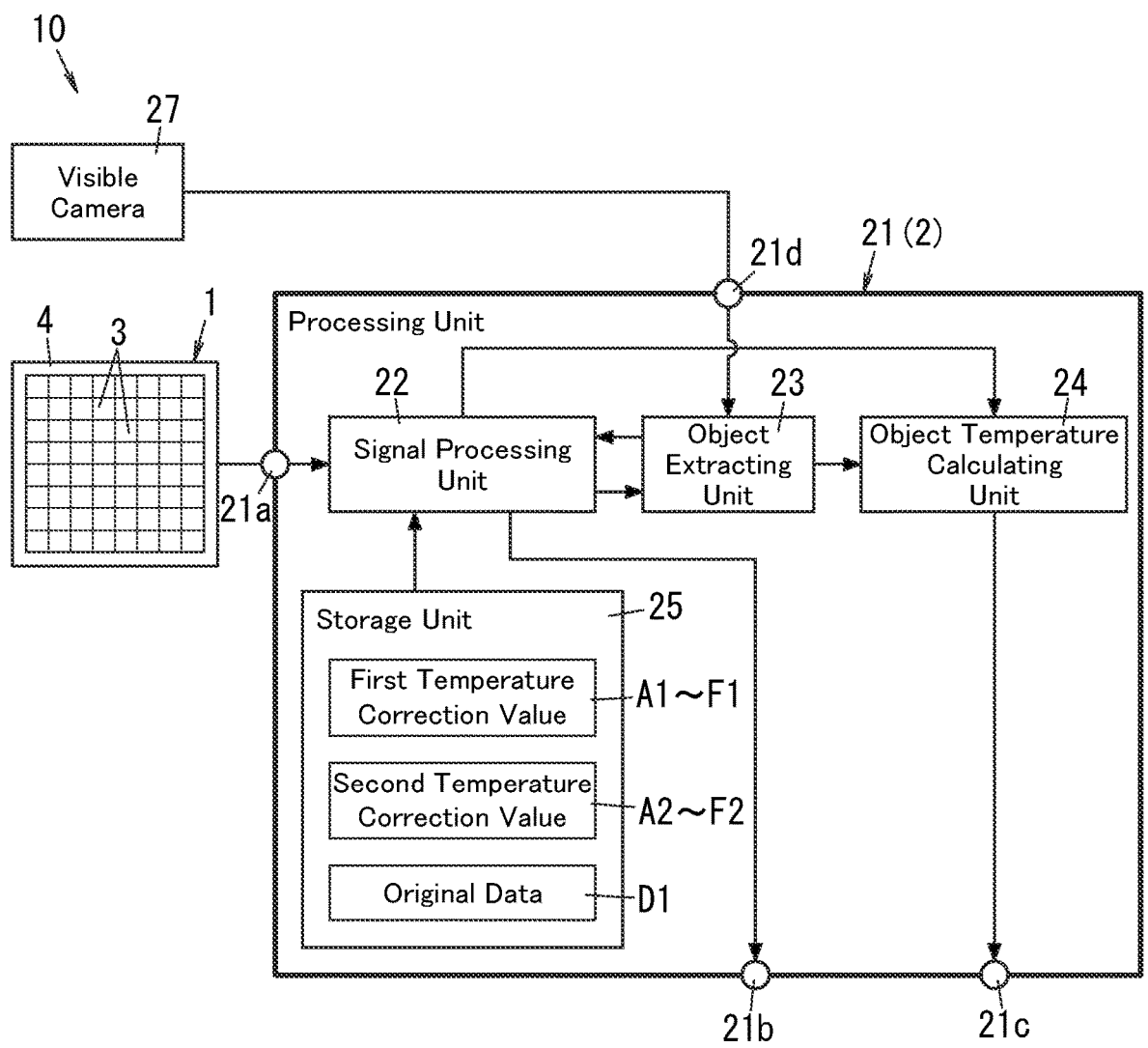
FIG. 4 is a block diagram of an infrared sensor system according to a third variation.

In the embodiment described above, as shown in FIG. 4, a visible camera 27 (a CCD image sensor, for example) may be provided for capturing an image of the objects as imaging targets. The image capturing range of the visible camera 27 overlaps with the image capturing range of the image sensor 1. The coordination system on the captured image of the image sensor 1 and the coordination system on the captured image of the visible camera 27 agree with each other. The output signal (a captured image) of the visible camera 27 is output via an input unit 21$d$ of the processing unit 21 to the object extracting unit 23.

According to the present variation, the object extracting unit 23 extracts objects as imaging targets from a captured image of the visible camera 27. More specifically, the object extracting unit 23 binarizes the captured image of the visible camera 27, for example, then extracts features of the binarized image to extract the objects as imaging targets, and finally generates the object information based on the result of the extraction. The signal processing unit 22 generates, based on the object information that has been generated by the object extracting unit 23, the second thermal image based on the original data D1. In this case, the signal processing unit 22 generates, as in the embodiment described above, the first thermal image, and then calculates the ambient temperature Ts, which is required for calculation by Expression 1, based on the first thermal image thus generated. Further, the object temperature calculating unit 24 calculates, based on the object information (i.e., the locations of the objects shot in the captured image of the visible camera 27) provided by the object extracting unit 23, the temperatures of the objects based on the second thermal image.

According to the present variation, the objects are extracted from the captured image of the visible camera 27. This enables determining the pixel locations of the objects more accurately in the second thermal image.

(Recapitulation)

An infrared processing system (2) according to a first aspect includes a process unit (21) configured to process an output signal of an image sensor (1) configured to receive an infrared ray coming from an object. The process unit (21) includes a first thermal image generating unit (22), an object extracting unit (23), a second thermal image generating unit (22), and an object temperature calculating unit (24). The first thermal image generating unit (22) is configured to generate, using a first temperature correction value (A1-F1), a first thermal image based on an output signal of the image sensor (1). The object extracting unit (23) is configured to extract the object from the first thermal image that has been generated by first thermal image generating unit (22). The second thermal image generating unit (22) is configured to generate, using a second temperature correction value (A2-F2) that corresponds to the object that has been extracted by the object extracting unit (23), a second thermal image based on the output signal of the image sensor (1). The object temperature calculating unit (24) is configured to calculate, based on the second thermal image that has been generated by the second thermal image generating unit (22), a temperature of the object that has been extracted by the object extracting unit (23).

According to this configuration, a first thermal image is generated, using first temperature correction values (A1-F1), based on an output signal of an image sensor (1), and then objects are extracted from the first thermal image thus generated. Accordingly, using, as the first temperature correction values (A1-F1), temperature correction values corresponding to a relatively broad temperature range enables extracting, from the first thermal image, the objects which tend to have different temperatures with moderate accuracy. Then, a second thermal image is generated based on the output signal of the image sensor (1) by using second temperature correction values (A2-F2) corresponding to the objects extracted from first thermal image, and then the temperatures of the objects that have been extracted are calculated based on the second thermal image thus generated. Thus, this enables accurately calculating the temperatures of the objects. As a result, the temperatures of objects which tend to have different temperatures may be calculated accurately based on the thermal image.

An infrared processing system (2) according to a second aspect, which may be implemented in conjunction with the first aspect, further includes a first storage unit (25) configured to store the output signal of the image sensor (1). The second thermal image generating unit (22) is configured to generate, using the second temperature correction value (A2-F2), the second thermal image based on the output signal stored in the first storage unit (25).

This configuration allows the second thermal image generating unit (22) to generate, using the output signal of the image sensor (1) stored in the first storage unit (25), the second thermal image after the process has been performed by the first thermal image generating unit (22).

An infrared processing system (2) according to a third aspect, which may be implemented in conjunction with the first or second aspect, includes a storage unit (25) configured to store a plurality of second temperature correction values (A2-F2) corresponding to the object that has been extracted by the object extracting unit (23). The second temperature correction value is one of the plurality of second temperature correction values.

This configuration enables changing the second temperature correction values (A2-F2) according to the object that has been extracted by object extracting unit (23). As a result, the temperature of the object may be calculated accurately.

An infrared processing system (2) according to a fourth aspect, which may be implemented in conjunction with any one of the first to third aspects, the second thermal image generating unit (22) is configured to correct, using the second temperature correction value (A2-F2), only a part, corresponding to the object extracted by the object extracting unit (23), of the output signal of the image sensor (1).

This configuration allows the second thermal image generating unit (22) to correct only a part, corresponding to the object, of the output signal of the image sensor (1), thereby reducing processing load on the second thermal image generating unit (22).

An infrared processing system (2) according to a fifth aspect, which may be implemented in conjunction with any one of the first to fourth aspects, the second thermal image generating unit (22) is configured to change the second temperature correction value (A2-F2) to use, depending on whether or not the temperature of the object that has been extracted by the object extracting unit (23) is equal to or higher than a threshold value.

This configuration allows changing the second temperature correction value (A2-F2) to be used by the second thermal image generating unit (22), according to the object, by comparing the temperature of the object with a threshold value.

An infrared processing system (2) according to a sixth aspect, which may be implemented in conjunction with any one of the first to fifth aspects, the second thermal image generating unit (22) is configured to adjust, when generating the second thermal image, the gain of the output signal of the image sensor (1) in accordance with the object that has been extracted by the object extracting unit (23).

This configuration allows the second thermal image to have a finer temperature resolution.

In the infrared processing system (2) according to a seventh aspect, which may be implemented in conjunction with any one of the first to sixth aspects, the second thermal image generating unit (22) is configured to change, when generating the second thermal image, a voltage range of the output signal of the image sensor (1) into a voltage range corresponding to the object that has been extracted.

This configuration allows the second thermal image to have a finer temperature resolution.

An infrared processing system (2) according to an eighth aspect, which may be implemented in conjunction with any one of the first to seventh aspects, further includes a visible camera (27) configured to capture an image of an object. The object extracting unit (23) is configured to extract an object from a captured image of the visible camera (27), instead of the first thermal image.

This configuration enables extracting the object more accurately from the first thermal image.

In an infrared processing system (2) according to a ninth aspect, which may be implemented in conjunction with any one of the first to eighth aspects, at least one of the first temperature correction value (A1-F1) or the second temperature correction value (A2-F2) is stored in a storage unit (25) so as to be rewritable.

This configuration allows at least one of the first temperature correction value (A1-F1) or the second temperature correction value (A2-F2) to be rewritten after the manufacture (after shipment) of the infrared processing system (2).

An infrared sensor system (10) according to a tenth aspect includes the infrared processing system (2) according to any one of the first to ninth aspects and the image sensor (1).

This configuration allows an infrared sensor system (10) including the infrared processing system (2) to be provided.

An infrared processing method according to an eleventh aspect includes a processing step including processing an output signal of an image sensor (1) having a plurality of photosensors (3), each receiving an infrared ray coming from an object. The processing step includes a first thermal image generating step, an object extracting step, a second thermal image generating step, and an object temperature calculating step. The first image generating step includes generating, using a first temperature correction value (A1-F1), a first thermal image based on the output signal of the image sensor (1). The object extracting step includes extracting an object from a first thermal image that has been generated in the first thermal image generating step. The second thermal image generating step includes generating, using a second temperature correction value (A2-F2) corresponding to the object that has been extracted in the object extracting step, a second thermal image based on the output signal of the image sensor (1). The object temperature calculating step incudes calculating, based on the second thermal image that has been generated in the second thermal image generating step, a temperature of the object that has been extracted in the object extracting step.

According to this method, a first thermal image is generated, using first temperature correction values (A1-F1), based on an output signal of an image sensor (1), and then objects are extracted from the first thermal image thus generated. Accordingly, using, as the first temperature correction values (A1-F1), temperature correction values corresponding to a relatively broad temperature range enables extracting, from the first thermal image, the objects which tend to have different temperatures with moderate accuracy. Then, a second thermal image is generated based on the output signal of the image sensor (1) by using second temperature correction values (A2-F2) corresponding to the objects extracted from first thermal image, and then the temperatures of the objects that have been extracted are calculated based on the second thermal image thus generated. Thus, this enables accurately calculating the temperatures of the objects. As a result, the temperatures of objects which tend to have different temperatures may be calculated accurately based on the thermal image.

A program according a twelfth aspect causes a computer system to execute the infrared processing method according to the eleventh aspect.

This allows providing a program that causes a computer system to perform the infrared processing method.

REFERENCE SIGNS LIST

1 Image Sensor
2 Infrared Processing System
21 Processing Unit
22 Second Thermal Image Generating Unit
23 Object Extracting Unit
24 Object Temperature Calculating Unit
25 Storage Unit (First Storage Unit, Second Storage)
27 Visible Camera
A1-F1 First Temperature Correction Value
A2-F2 Second Temperature Correction Value

The invention claimed is:

1. An infrared processing system comprising
a processing unit configured to process an output signal of an image sensor that is configured to receive an infrared ray coming from an object,
the processing unit including:
  a first thermal image generating unit configured to generate, using a first temperature correction value, a first thermal image based on an output signal of the image sensor;
  an object extracting unit configured to extract the object from the first thermal image that has been generated by the first thermal image generating unit;
  a second thermal image generating unit configured to generate, using a second temperature correction value corresponding to the object that has been extracted by the object extracting unit, a second thermal image from an output signal which is same as the output signal from which the first thermal image is generated; and
  an object temperature calculating unit configured to calculate, based on the second thermal image that has been generated by the second thermal image generating unit, a temperature of the object that has been that has been extracted by the object extracting unit.

2. The infrared processing system of claim 1, further comprising a first storage unit configured to store the output signal of the image sensor, wherein
the second thermal image generating unit is configured to generate, using the second temperature correction value, the second thermal image based on the output signal stored in the first storage unit.

3. The infrared processing system of claim 1, further comprising a second storage unit configured to store a plurality of second temperature correction values corresponding to the object that has been extracted by the object extracting unit, the second temperature correction value being one of the plurality of second temperature correction values.

4. The infrared processing system of claim 1, wherein
the second thermal image generating unit is configured to correct, using the second temperature correction value, only a part, corresponding to the object extracted by the object extracting unit, of the output signal of the image sensor.

5. The infrared processing system of claim 1, wherein
the second thermal image generating unit is configured to change the second temperature correction value to use, depending on whether or not the temperature of the object that has been extracted by the object extracting unit is equal to or higher than a threshold value.

6. An infrared processing system comprising
a processing unit configured to process an output signal of an image sensor configured to receive an infrared ray coming from an object,
the processing unit including:
  a first thermal image generating unit configured to generate, using a first temperature correction value, a first thermal image based on an output signal of the image sensor;
  an object extracting unit configured to extract the object from the first thermal image that has been generated by the first thermal image generating unit;
  a second thermal image generating unit configured to generate, using a second temperature correction value corresponding to the object that has been extracted by the object extracting unit, a second thermal image based on the output signal of the image sensor; and
  an object temperature calculating unit configured to calculate, based on the second thermal image that has been generated by the second thermal image generating unit, a temperature of the object that has been that has been extracted by the object extracting unit,
wherein the second thermal image generating unit is configured to adjust, when generating the second thermal image, gain of the output signal of the image sensor in accordance with the object that has been extracted by the object extracting unit.

7. An infrared processing system comprising
a processing unit configured to process an output signal of an image sensor configured to receive an infrared ray coming from an object,
the processing unit including:
  a first thermal image generating unit configured to generate, using a first temperature correction value, a first thermal image based on an output signal of the image sensor;
  an object extracting unit configured to extract the object from the first thermal image that has been generated by the first thermal image generating unit;
  a second thermal image generating unit configured to generate, using a second temperature correction value corresponding to the object that has been extracted by the object extracting unit, a second thermal image based on the output signal of the image sensor; and
  an object temperature calculating unit configured to calculate, based on the second thermal image that has been generated by the second thermal image generating unit, a temperature of the object that has been that has been extracted by the object extracting unit, wherein the second thermal image generating unit is configured to change, when generating the second thermal image, a voltage range of the output signal of the image sensor into a voltage range corresponding to the object that has been extracted.

8. The infrared processing system of claim 1, further comprising a visible camera configured to capture an image of an object, wherein the object extracting unit is configured to extract the object from a captured image of the visible camera, instead of the first thermal image.

9. The infrared processing system of claim 1, wherein at least one of the first temperature correction value or the second temperature correction value is stored in a storage unit so as to be rewritable.

10. An infrared sensor system comprising:
the infrared processing system of claim 1; and
the image sensor.

11. An infrared processing method comprising
a processing step including processing an output signal of an image sensor having a plurality of photosensors, each of the plurality of photosensors being configured to receive an infrared ray coming from an object, the processing step including:

a first thermal image generating step including generating, using a first temperature correction value, a first thermal image based on the output signal of the image sensor;

an object extracting step including extracting the object from the first thermal image that has been generated in the first thermal image generating step;

a second thermal image generating step including generating, using a second temperature correction value corresponding to the object that has been extracted in the object extracting step, a second thermal image from an output signal which is same as the output signal from which the first thermal image is generated; and an object temperature calculating step including calculating, based on the second thermal image that has been generated in the second thermal image generating step, a temperature of the object that has been extracted in the object extracting step.

12. A non-transitory storage medium storing a program which is designed to cause a computer system to perform the infrared processing method of claim 11.

* * * * *